July 14, 1931.  A. C. HYNAN  1,814,161
DEMOUNTABLE WHEEL
Filed April 4, 1927   3 Sheets-Sheet 1
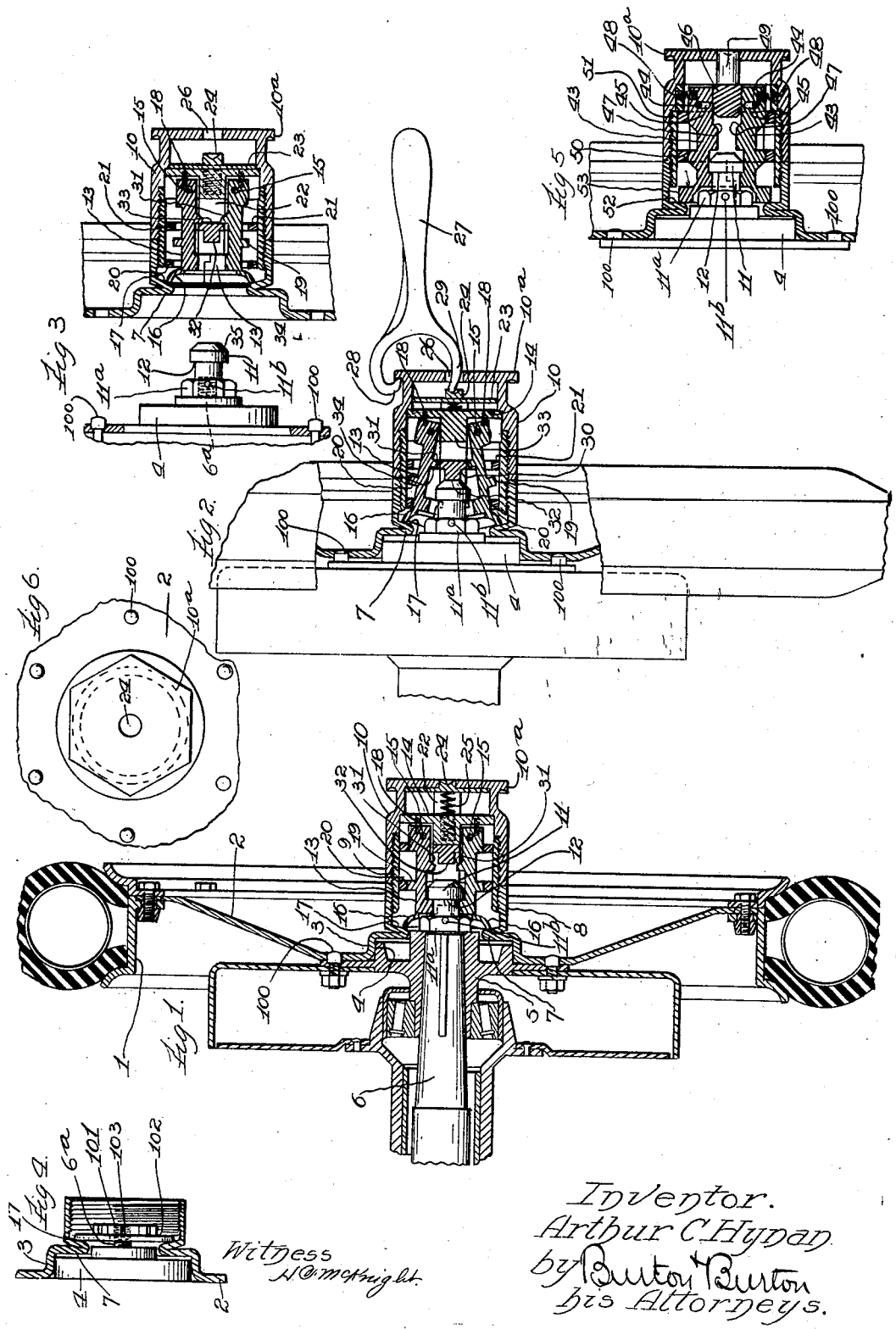

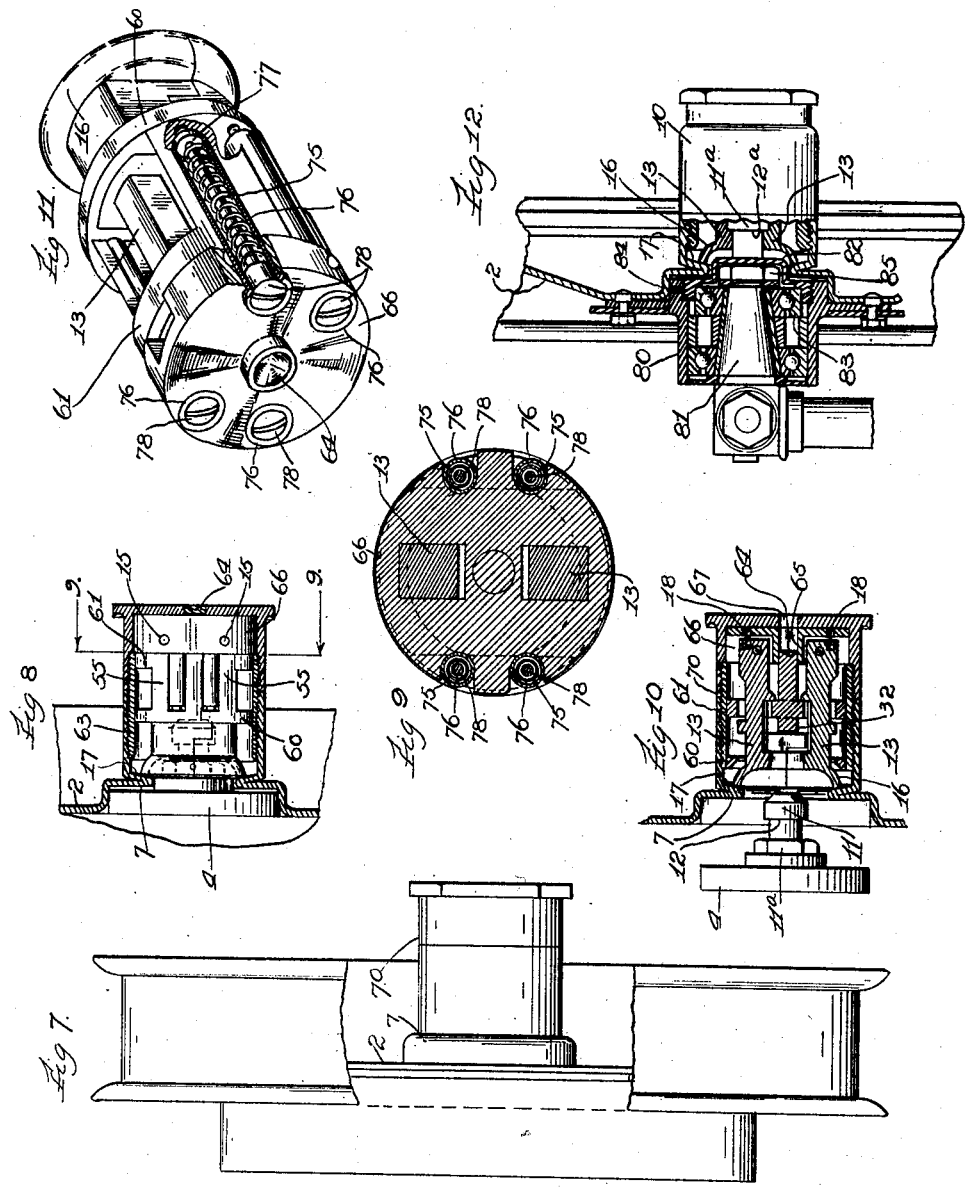

July 14, 1931.  A. C. HYNAN  1,814,161
DEMOUNTABLE WHEEL
Filed April 4, 1927  3 Sheets-Sheet 3
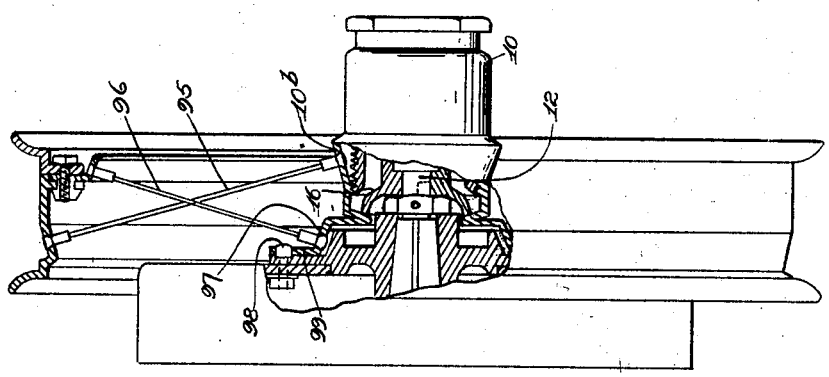
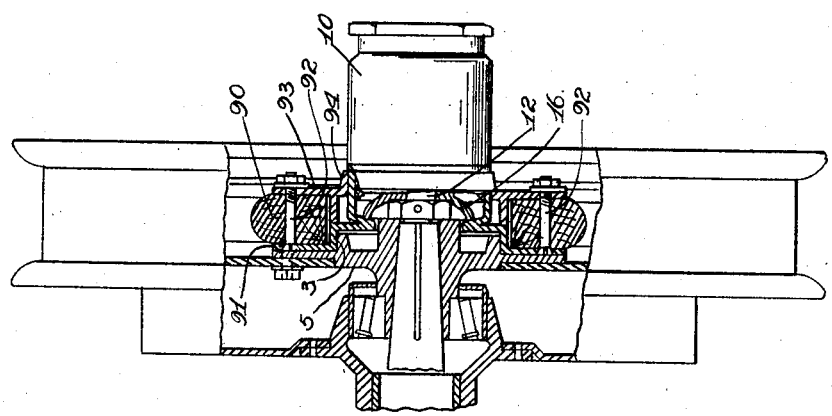
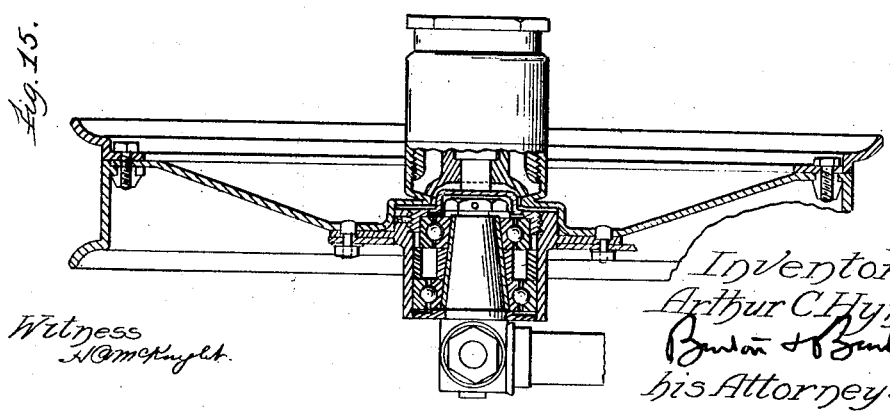

Patented July 14, 1931

1,814,161

UNITED STATES PATENT OFFICE

ARTHUR C. HYNAN, OF CHICAGO, ILLINOIS, ASSIGNOR TO ROBERT N. BURTON, OF CHICAGO, ILLINOIS

DEMOUNTABLE WHEEL

Application filed April 4, 1927. Serial No. 180,968.

This invention relates to fastening or locking means adapted for use with vehicle wheels, particularly of the type employed on automobiles, motor trucks and buses, and its purpose is to provide an improved construction rendering the wheel demountable by quick release from a separable hub and also permitting of ready replacement of the wheel by a single movement without subsequent adjustment of holding or locking means. It consists of certain features and elements of construction herein shown and described as indicated in the claims.

In the drawings:

Figure 1 is an axial sectional view of a disk wheel of the automobile type and embodying the hub structure and locking means of this invention.

Figure 2 is a partial elevation with the hub portion of the wheel shown in section at the same axial plane as in Figure 1, but illustrating the locking means in releasing position with a tool for effecting such release.

Figure 3 is a fragmentary sectional view of the separated hub and central portion of the wheel showing the locking devices positioned ready for replacement of the wheel on the hub.

Figure 4 is a detail axial section of associated parts of the wheel and hub with a temporary fastening device to be substituted for the locking means of this invention.

Figure 5 is an axial section corresponding to Figure 1, showing a slightly modified form of the invention.

Figure 6 is a fragmentary side elevation of the wheel showing the contour of the end of the hub.

Figure 7 is an elevation of a wheel with a portion of the rim broken away to show the outline of the central shell enclosing a second modified form of locking means.

Figure 8 is an elevation of the internal parts of the modified lock being taken as an axial section through the shell walls and disk of the wheel body.

Figure 9 is a transverse section taken as indicated at line 9—9, on Figure 8.

Figure 10 is an axial section of the locking means taken similarly to Figure 3 and showing the modified lock of Figure 8 disengaged from the wheel hub but with the parts ready for replacement of the wheel.

Figure 11 is a perspective view of the locking device removed from its enclosing shell and with a portion broken away to show a detail of construction.

Figure 12 is an axial section showing a front wheel hub mounted on the knuckle spindle of a steering axle and indicating the method of adapting the invention to this structure.

Figure 13 shows a rear wheel of the wooden spoke type with locking means embodying the invention applied thereto.

Figure 14 illustrates the application of the invention to a wire spoked wheel.

Figure 15 illustrates the application of the invention to a disk wheel, described with reference to Figure 12.

The locking devices herein illustrated and described involve certain improvements over those shown in my former application Serial No. 716,187 filed May 27, 1924 and are directed primarily to increasing the security of the fastening or locking means and also to making the device somewhat more compact than in previous forms. Referring first to Figure 1, I have chosen for purposes of illustration an automobile wheel of the disk type having a tire-receiving rim, 1, and a body disk, 2, the latter being formed with an annular cup or recess at 3, which provides a shoulder for seating on the cylindrical surface, 4, of the separable hub, 5. The hub is shown keyed to the end portion, 6, of a driving axle such as the usual rear axle of an automobile. The central portion of the material comprising the wheel disk, 2, is crimped inwardly at 7, and thence extends in cylindrical form parallel to the axis at 8, being internally threaded to receive an extension sleeve, 9, onto which the enclosing shell, 10, is screwed for housing the parts of the fastening device or lock constituting this invention. In the arrangement shown the axle is provided with a central extension, 11, which is rigid with the axle and is thus rigidly associated with the separable hub, 5, of the wheel. An inwardly-facing shoulder, 12, on the part, 11, provides a locking face for engagement by the hooked end portions of the jaw members, 13, which are carried in the base block, 14, of the lock on pivots, 15. In the form shown in the drawings it may be understood that two jaw members, 13, are provided and that they completely embrace the part, 11, adjacent its shoulder, 12. Flared extensions, 16, of the jaws, 13, engage the outwardly-facing annular shoulder, 17, formed by the crimping of the wheel disk at 7, so that when the parts are in locking position as shown in Fig. 1, the jaw members are snugly interposed between the shoulders, 12 and 17, and thus hold the wheel against removal from the hub independently of any strain on other portions of the jaws or the locking device. That is, any outward movement of the wheel disk with respect to the hub, 5, would involve a corresponding movement of the shoulder, 17, toward the plane of the shoulder, 12, and such movement is directly blocked by the presence of the jaws whose hooked end portions and their extensions, 16, fill in the distance between said shoulders.

The jaws, 13, are yieldingly urged into locking position by springs, 18, pocketed in portions of the jaws adjacent their pivots, 15, and in the base lock, 14; but they are more positively held in locking position by a retaining member, 20, which engages radially-projecting portions, 19, on the shanks of the jaws, 13, adjacent their hooked end portions and also by a similar retaining member, 21, which embraces the jaws at points nearer their pivots, 15. The parts, 20 and 21, are connected together by side bars, 22, extending parallel to the axis of the hub and outwardly into connection with an actuating plate, 23, which serves as a yoke between the side bars, 22 and also provides a central plunger or button, 24, to which pressure may be applied for sliding the retaining members, 20 and 21 in axial direction to the position shown in Figure 2 for releasing the jaws. Springs, 25, yieldingly hold the yoke, 23, and its connective retaining members in locking position as shown in Figure 1. A central aperture, 26, in the end wall of the shell, 10, gives access to the plunger, 24, and for convenience I provide a tool, 27, having a hooked fork, 28, which may be engaged with the flange, 10ª, of the shell, 10, while the other fork, 29, enters the aperture, 26, for depressing the plunger, 24, as shown clearly in Figure 2. The slight rocking movement of the handle of the tool, 27, to effect the release of the locking jaws, 13, produces a reaction of the hook, 28, against the flange, 10ª, which tends to withdraw the wheel disk, 2, and its central shell, 10, from the separable hub, 5, so that the single motion employed for releasing the lock also initiates the actual removal of the wheel.

The central portion of the retaining member, 21, includes inwardly-facing transaxial shoulders, 30, which encounter the sloping shoulders, 31, on the inner faces of the jaw members, 13, when the part, 21, is moved toward releasing position. This produces a cam action operating to force the jaws, 13, apart after the retaining members have moved out of registration with the portions of the jaws which they normally engage in locked position. The releasing action brings a central knob or projection, 32, on the part, 21, into contact with the end of the part, 11, thus providing positive fulcrum for the fork, 29, over which the forks, 28, may operate for withdrawing the wheel from the hub surface, 4. Finally the part, 21, is forced to the position shown in Figure 3 in which its outer face, 33, has passed the inwardly-facing shoulders, 34, of the jaw members, 13, allowing the jaws to close under the action of their springs, 18, but with positive retaining members, 20 and 21, out of active position. This permits the wheel to be readily replaced on the hub because the beveled end portion, 35, of the part, 11, will force open the yieldingly held jaws, 13, widely enough to disengage the shoulders, 34, from the face, 33, and thus permit the yoke plate, 23, to move outwardly under pressure of its springs, 25, as soon as the jaws have snapped into engagement with the groove behind the shoulder, 12. The outward movement of the plate, 23, of course carries with it the retaining members, 20 and 21, returning them to the position shown in Figure 1 for positively holding the jaws together, and in this position the extensions, 16, of the jaws, again encounter the shoulder, 27, and block removal of the wheel until the tool, 27, is again applied at the opening, 26.

Figure 5 illustrates a modification in which the jaws, 43 are arranged to move outwardly by a direct radial sliding movement instead of swinging about pivots. To permit this they are anchored in a base block by pins, 44, but said pins engage slots, 45, in the jaws and the jaw movement is effected by a cam block, 46, acting upon sloping shoulders, 47, on the inner sides of the jaw members. The springs, 48, act against the jaws in radial direction with respect to the wheel axis for holding them snugly in contact with the cam block, 46, even after the plunger, 49, has forced the block inwardly and carries with it the retaining members, 50 and 51, to a position permitting outward movement of the jaw members as they are wedged apart by further travel of the cam block, 46. In other respects the principle of this mechanism is similar to that already described and it may be operated by a tool such as that shown at 27, Fig. 2.

Figures 7 to 11 inclusive illustrate a modified form in which the necessary length of shell to contain the locking mechanism is somewhat reduced as to the first form described. As seen in Fig. 8, this arrangement provides longitudinal connectors, 55, between the retaining members, 60 and 61, positioned just inside the sleeve, 63, which encloses the lock mechanism; but instead of extending these side bars, 55, further outward to a yoke plate as in Fig. 1, they terminate at the part, 61, and the latter serves as a yoke plate and carries a central plunger, 64, guided in a central bore, 65, in the base block, 66, in which the jaws, 13, are pivoted. An aperture, 67, in the end of the shell, 70, gives access to the plunger, 65, for operation, but the space occupied by the yoke plate, 23, of Fig. 1 in its reciprocating movement is entirely saved in this modified design. Instead of the springs, 25, I provide a plurality of springs, 75, enclosed in tubular guides, 76, which project inwardly from the base block, 66, and on which the connected retainers, 60 and 61, are slidable. The inner ends of the tubes, 76, are shouldered at 77, and oppositely-facing shoulders are provided by the heads, 78 of studs, 79, secured in the retainer, 60, said heads being snugly fitted in the tubes, 76, for sliding therein and compressing the springs, 75 as the assembly moves inward. These four springs thus operate to hold the retaining members, 60 and 61, normally in locking position or to return them forcibly to that position when the wheel is entered on the hub and the jaws, 13, snap into engagement behind the shoulder, 12, of the extension, 11. In other respects, in construction and operation, this lock is similar to that shown in Figure 1.

Figure 12 indicates the method of applying a lock of this type to a front wheel in which the hub, 80, necessarily rotates on the axle or spindle, 81. In such cases a flanged cup, 82, is used to retain the outer ball race, 83, of the hub, being screwed in position and locked in place by a set screw, 84. The cup, 82, thus bridges over the nut, 85, on the end of the axle, 81, forming a cap over it which rotates with the hub, 80. The projection, 11$^a$, with locking shoulder, 12$^a$, is then formed as an integral or rigid portion of the cup, 82, and the locking jaws, 13, are engaged with this extension, 11$^a$, as seen in Fig. 12. The wheel disk, 2, and central shell, 10, may thus be identical with that used as a rear wheel and shown in Figure 1. Or, in other words, all the wheels of the vehicle may be interchangeable.

Figure 13 indicates that no material alteration in design is required for applying this invention to a wheel having wooden spokes, 90, instead of a steel disk web, 2. With this spoke construction the hub, 5, may be very similar to that shown in Fig. 1, but the cup, 3, which fits the hub terminates in a flange, 91, which becomes one of the clamping flanges between which the spokes, 90, are secured and held by clamping bolts, 92. A removable clamping flange, 93, is assembled opposite the flange, 91, and may have an inner shoulder, 94, which is slipped over the shell, 10, in assembly of the parts.

Figure 14 shows a slight modification in the form of the lock enclosing shell so as to provide a conical part, 10$^b$, in which one set of wire spokes, 95, may be anchored. The other spokes, 96, are engaged in an oppositely inclined shoulder, 97, in the inner end portion of the shell, while the driving studs, 98, also serve for centering and seating the wheel on the hub by engagement with apertures in the transaxial portion, 99, of the shell flange. In the disk wheel type shown in Fig. 1 the driving studs, 100, serve only to transmit the torque from the hub to the wheel disk.

In the event of accidental injury to the locking device, it may be removed bodily by unscrewing the shell, 10, and sleeve, 9, from the cylindrical center flange, 8, of the wheel. The shouldered member, 11, is not actually integral with the axle, 6, but is screwed onto a reduced terminal portion, 6$^a$, being provided with a hexagonal base, 11$^a$, for that purpose, and being locked in its final position by means of a pin, 11$^b$, inserted through its base. This part may be temporarily removed so as to expose the threaded terminal, 6$^a$, of the axle, and the wheel will then be secured by the application of the repair nut, 101, of castelated form having a broad flange, 102, dimensioned to engage the outwardly facing shoulder, 17, of the crimped part, 7. A locking pin, 103, may be inserted to hold the nut firmly in place so that the vehicle may be safely operated until the locking device can be repaired or replaced.

I claim:—

1. In combination with a wheel and its hub with which it is separably associated, an axle on which the hub is mounted, a part rigidly associated with said hub having a shoulder facing inwardly with reference to the end of the axle, the wheel having an outwardly facing shoulder, a locking member carried by the wheel and formed to fit between said shoulders for holding the wheel and hub together, and a retaining member axially movable in the wheel engageable with said locking member to hold it in locking position and disengageable therefrom for releasing the wheel from the hub.

2. In combination with a wheel and a separable hub therefor, an axle on which the hub is mounted, a part rigidly associated with said hub having a groove forming an annular shoulder which faces inwardly with respect to the end of the axle, the wheel having an outwardly facing shoulder, a pair of locking members carried by the wheel formed to fit between said shoulders for holding the wheel and hub together, and retaining means mounted in the wheel formed to embrace said locking members but axially movable in the wheel for releasing them, and means operable with said retainer for spreading the locking members to disengage them from one of said shoulders.

3. In combination with a wheel and its hub with which it is separably associated, an axle on which the hub is mounted, a peripherally grooved part rigidly associated with said hub whose groove provides a shoulder facing inwardly with reference to the end of the axle, the wheel having an outwardly facing shoulder located inwardly along the axis with reference to the said shoulder of the groove, a pair of locking members formed to engage the groove and dimensioned to fit between said shoulders for holding the wheel and hub together, said members being pivotally mounted in the wheel at a distance from their groove engaging portions, a retaining member axially movable in the wheel adapted to embrace said members when they are engaged in the groove, said retainer member being yieldably held in such relation, and means for shifting it axially to release the locking members.

4. In the combination defined in claim 1, said wheel including a hub shell and said locking means being housed entirely within said shell, the shell having an axial aperture at its outer end and a depressible part opposite said aperture accessible for actuating the lock.

5. In combination with a wheel and its hub with which it is separably associated, an axle on which the hub is mounted, a part rigidly associated with said hub having a shoulder facing inwardly with respect to the end of the axle, the wheel having an outwardly facing shoulder located inwardly along the axis with reference to said shoulder of the hub, a locking member carried by the wheel and formed to fit between said shoulders, yielding means urging said locking member into such locking position, a retaining member mounted in the wheel and held yieldingly in position to oppose release of the locking member but axially movable away from such retaining position, yielding means urging said retaining member to return and a stop shoulder on the locking member positioned to oppose such return movement of the retaining member.

ARTHUR C. HYNAN.